(12) United States Patent
Murry et al.

(10) Patent No.: US 7,478,955 B2
(45) Date of Patent: Jan. 20, 2009

(54) MODULAR LASER PACKAGE SYSTEM

(75) Inventors: Stefan J. Murry, Houston, TX (US); Zulfikar Morbi, Sugar Land, TX (US); Kai-Sheng (Kevin) Lin, Sugar Land, TX (US)

(73) Assignee: Applied Optoelectronics, Inc., Sugar Land, TX (US)

(*) Notice: Subject to any disclaimer, the term of this patent is extended or adjusted under 35 U.S.C. 154(b) by 0 days.

(21) Appl. No.: 11/671,587

(22) Filed: Feb. 6, 2007

(65) Prior Publication Data

US 2007/0189677 A1    Aug. 16, 2007

Related U.S. Application Data

(63) Continuation-in-part of application No. 11/162,374, filed on Sep. 8, 2005, now Pat. No. 7,290,943.

(60) Provisional application No. 60/595,880, filed on Aug. 12, 2005.

(51) Int. Cl.
    *G02B 6/36* (2006.01)
(52) U.S. Cl. .......................................... 385/92; 385/14
(58) Field of Classification Search .................. None
    See application file for complete search history.

(56) References Cited

U.S. PATENT DOCUMENTS

| | | | |
|---|---|---|---|
| 4,399,541 A | 8/1983 | Kovats et al. | |
| 5,068,865 A | 11/1991 | Ohshima et al. | |
| 5,227,646 A | 7/1993 | Shigeno | |
| 5,399,858 A | 3/1995 | Kinoshita | |
| 6,023,542 A | 2/2000 | Pan et al. | |
| 6,198,858 B1 | 3/2001 | Pan et al. | |
| 7,059,780 B2 | 6/2006 | Yamabayashi et al. | |
| 2003/0026557 A1 | 2/2003 | Galeotti et al. | |
| 2003/0178615 A1 | 9/2003 | Sato | |
| 2005/0018994 A1* | 1/2005 | Riaziat et al. | ............... 385/147 |
| 2005/0036535 A1 | 2/2005 | Knopp et al. | |
| 2006/0165353 A1 | 7/2006 | Miao et al. | |

* cited by examiner

*Primary Examiner*—Hemang Sanghavi
*Assistant Examiner*—Kajli Prince
(74) *Attorney, Agent, or Firm*—N. Stephen Kinsella; Grossman Tucker Perreault & Pfleger, PLLC

(57) ABSTRACT

A modular laser package system may be used to mount one type of laser package, such as a coaxial or TO (transistor outline) can laser package, to a circuit board, such as a transmitter board or a motherboard, designed to receive another type of laser package housing, such as a butterfly-type laser package housing. The modular laser package system may include a circuit board mounting platform, a laser housing mount to mount the laser package to the circuit board mounting platform, and a mounting base to facilitate mounting to the transmitter board or motherboard. The modular laser package system may also include a temperature control device, such as a thermoelectric cooler (TEC), and a temperature sensor, such as a thermistor, mounted to the laser housing mount to control and monitor the temperature of the laser package.

5 Claims, 3 Drawing Sheets

MODULAR LASER PACKAGE SYSTEM

CROSS-REFERENCE TO RELATED APPLICATIONS

This application is a continuation-in-part of U.S. patent application Ser. No. 11/162,374, filed on Sep. 8, 2005, now U.S. Pat. No. 7,290,943 which claims the benefit of U.S. Provisional Application Ser. No. 60/595,880, filed Aug. 12, 2005, all of which are fully incorporated herein by reference.

TECHNICAL FIELD

The present invention relates to laser packaging and in particular, to a modular laser package system capable of mounting one type of laser package to a circuit board designed for another type of laser package.

BACKGROUND INFORMATION

The following descriptions and examples are not admitted to be prior art by virtue of their inclusion within this section.

Semiconductor lasers are used in a variety of applications, such as high-bit-rate optical fiber communications. To provide optical fiber communications, lasers are optically coupled to fibers to enable modulated light output from the laser to be transmitted into the fiber. Various modules, assemblies or packages are used to hold and align the laser, other optical components (e.g., collimation and coupling lenses, isolators, and the like), and optical fiber such that the laser is optically coupled to the fiber. The process of aligning an optical fiber to a laser diode and fixing it in place is sometimes referred to as fiber pigtailing. Standard laser package types include coaxial or TO (transistor outline) can laser packages and butterfly laser packages.

In a TO can laser package, for example, the laser (e.g., a laser diode) and the light-receiving end of the optical fiber may be mounted together within a substantially cylindrical housing. The laser may be mounted on a laser submount on the TO can post of the TO can header. The fiber end may be disposed in a rigid cylindrical ferrule mounted to the TO can housing. The TO can housing may also contain other related components, such as a lens and a monitor photodiode, and may be hermetically sealed. A standard TO can housing generally does not contain a temperature control device such as a thermoelectric cooler (TEC).

In a butterfly type laser package, the laser and related components are mounted on a platform such as an optical bench within a metal boxlike housing that is hermetically sealed. These related components may include laser circuitry including signal conditioning and impedance matching circuits, and a temperature sensor. The laser and laser circuitry are electrically connected to one or more pins extending laterally from the housing (e.g., 7 pins on each side). In one type of butterfly type housing, there is an opening in an end sidewall of the housing that receives a metal pipe or ferrule. The fiber is inserted through the ferrule into the inside of the housing and soldered to the ferrule for a sealed fit. Components such as an isolator and one or more lenses may be disposed on the platform between the laser and the input end of the fiber. The optical bench may be mounted on a temperature control device, such as a Peltier effect element or a thermoelectric cooler (TEC), inside the boxlike housing. The TEC is used to control the temperature of the diode laser to permit higher performance and/or operation over a greater power range. For these and other reasons, butterfly laser packages are generally more expensive than TO can laser packages and are generally used for higher performance applications.

The butterfly housing may be mounted onto a larger circuit board, sometimes referred to as a transmitter board or motherboard, which contains external circuitry (such as drive circuitry and other circuitry) and a heatsink in contact with the TEC. The transmitter board contains a mating section designed to receive the butterfly housing. The mating section may be, for example, a rectangular opening in the transmitter board having contact points around the opening on the upper surface of the board. The contact points are located so as to be in contact with the pins extending laterally from the butterfly housing when it is lowered into the opening so that the pins are flush with the upper surface of the transmitter board. Existing TO can housings are generally not designed to be mounted into such mating sections designed for butterfly type housings.

BRIEF DESCRIPTION OF THE DRAWINGS

These and other features and advantages will be better understood by reading the following detailed description, taken together with the drawings wherein.

DETAILED DESCRIPTION

Figure 1:
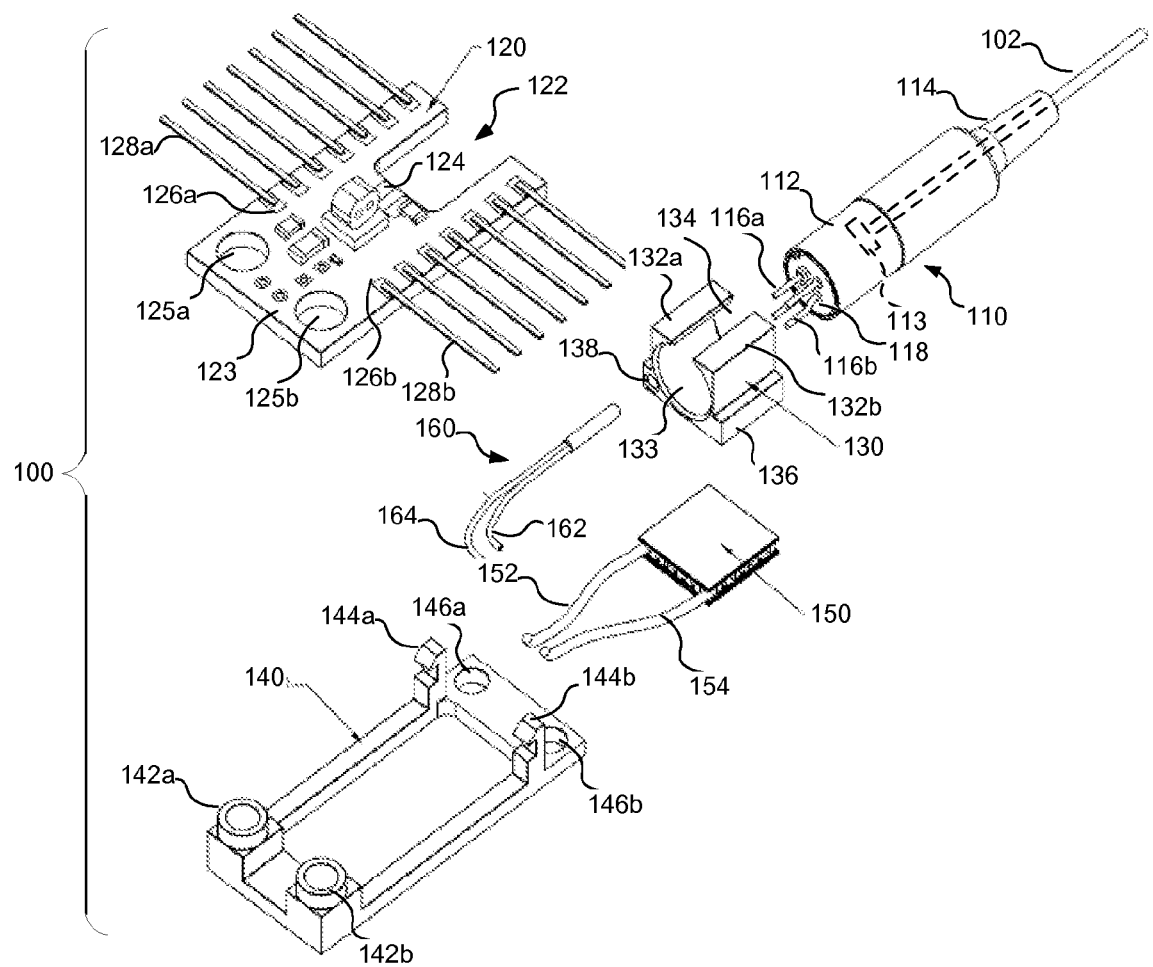
FIG. 1 is an exploded view of the modular laser package system, consistent with one embodiment of the present invention.

Referring to FIG. 1, a modular laser package system 100 may be used to mount one type of laser package 110, such as a coaxial or TO can laser package, to a circuit board (not shown), such as a transmitter board or motherboard, designed to receive another type of laser package, such as a butterfly-type laser package. Those skilled in the art will recognize that the modular laser package system 100 may also be used to mount other types of laser packages. The modular laser package system 100 may include a circuit board mounting platform 120, a laser housing mount 130 to mount the laser package 110 to the circuit board mounting platform 120, and a mounting base 140 to facilitate mounting into another circuit board, such as the transmitter board or motherboard. The modular laser package system 100 may also include a temperature control device 150, such as a thermoelectric cooler (TEC), and a temperature sensor 160, such as a thermistor.

One embodiment of the laser package 110 may include a substantially cylindrical laser-fiber housing 112, such as a TO can housing. The laser-fiber housing 112 may contain a laser 113, such as a diode laser, coupled to one end of an optical fiber 102 in a manner known to those skilled in the art. A rubber boot 114 may be located at one end of the housing 112, for example, to provide strain relief for the optical fiber 102. One or more electrical leads 116a 116b coupled to the laser 113 extend end. The leads 116a, 116b may be coupled to drive circuitry, either directly or indirectly, which modulates the laser 113 to transmit a modulated laser signal into the end of the fiber 102. The laser package 110 may also include other components within the laser-fiber housing 112 such as a lens and a monitor photodiode. The laser-fiber housing 112 may be made of metal and may be hermetically sealed.

One embodiment of the circuit board mounting platform 120 includes a circuit board 123 defining a mounting region 122 and including electrical contacts 124, 126a, 126b. The circuit board 123 may have a printed circuit board structure, such as the type known to those skilled in the art. The contacts 124, 126a, 126b may be electrically connected to signal traces and/or ground planes in the circuit board 123 to provide interconnections with other contacts and/or with circuit components or circuitry on the circuit board 123, as discussed below. Although contacts are shown on the top surface of the circuit board 123, electrical contacts may also be located on the bottom surface of the circuit board 123.

One group of contacts 124 may be electrically coupled (e.g., by solder) to the leads 116a, 116b extending from the face 118 of the laser-fiber housing 112. Other groups of contacts 126a, 126b may be located along opposing sides of the circuit board and electrically coupled (e.g., by solder) to pins 128a, 128b that extend laterally from the sides of the circuit board 123. In one embodiment, the dimensions of the circuit board mounting platform 120 and the orientation, number and dimensions of the pins 128a, 128b extending from the circuit board mounting platform 120 are compatible with a standard butterfly package housing. Although the illustrated embodiment shows seven (7) contacts 126a, 126b and pins 128a, 128b on each side of the circuit board mounting platform 120 compatible with a fourteen (14) pin butterfly design, other numbers of contacts and lateral pins may be used to be compatible with other designs.

Circuit components, such as laser interfacing circuitry, may be mounted on the circuit board 123 and electrically coupled to the leads 116a, 116b and/or the pins 128a, 128b via the circuit board 123. Pins 128a, 128b may also be coupled to external drive circuitry such that the drive circuitry is coupled via the interfacing circuitry to the leads 116a, 116b and the laser 113. Laser interfacing circuitry may include various circuitry for conditioning or modifying the electrical signals applied to the laser 113 and/or for interfacing with external drive circuitry. According to one embodiment, for example, laser interfacing circuitry includes impedance matching circuits for impedance matching the laser to drive circuits. The laser interfacing circuitry may also include signal conditioning circuits that condition the signals being applied to the laser 113. In other embodiments, the laser interfacing circuitry may include drive circuitry or other circuitry.

The mounting region 122 of the circuit board mounting platform 120 may be formed as a slot or opening in one end of the circuit board 123 that receives the laser housing mount 130. One embodiment of the laser housing mount 130 includes a housing mounting portion that receives and engages the laser-fiber housing 112 in a slip fit. The housing mounting portion may include first and second sides 132a, 132b defining a substantially cylindrical passageway 133 and a slit or opening 134 along the length of the passageway 133. The passageway 133 may be dimensioned relative to the dimensions of the laser-fiber housing 112 such that the laser-fiber housing 112 is held between the sides 132a, 132b in a friction fit. The opening 134 allows the sides 132a, 132b to bend resiliently such that the sides engage the housing 112 when positioned within the passageway 133 to provide the friction fit. The contact between the laser-fiber housing 112 and the laser housing mount 130 facilitates thermal conductivity. The laser mount 130 also aligns the laser housing 112 with the circuit board 123 such that leads 116a, 116b are proximate and may be electrically coupled to the contacts 124 on the top and/or bottom of the circuit board 123.

The laser housing mount 130 may be dimensioned to fit within the mounting region 122 of the circuit board mounting platform 120 and to enable electrical coupling with the circuit board 123. The laser housing mount 130 may be soldered directly to the circuit board 123 such that the laser housing mount 130 is electrically coupled to a ground plane of the circuit board 123. The laser housing mount 130 may be made of any electrically and thermally conductive material capable of being soldered to the circuit board 123. Examples of the material for the laser housing mount 130 include, but are not limited to, brass, copper, aluminum and other alloyed metals.

One embodiment of the laser housing mount 130 enables advantages over other modular laser package systems. Using a slip fit or friction fit design may facilitate manufacturing by allowing the laser package 110 to be secured to the circuit board mounting platform 120 without using epoxy. Thermal performance may also be improved because of the extended contact surface area between the laser-fiber housing 112 and the housing mount 130 along the length of the passageway 133. Soldering the laser housing mount 130 directly to the circuit board 123 may further improve the RF frequency response characteristics and may avoid the need for an external electronic impedance matching circuit. The exemplary embodiment of the laser housing mount 130 may also allow the laser housing mount 130, laser-fiber housing 112 and circuit board 123 to have the same RF ground plane by metal-to-metal contact over a relatively large surface area, as compared to a RF ground plane connection made only through the ground pin of the laser package. The common RF ground plane may improve RF frequency flatness characteristics and may further avoid the need to use external electronic matching circuits.

The laser housing mount 130 may also include a temperature control device mounting portion 136 that receives and mounts the temperature control device 150. According to one embodiment, the temperature control device mounting portion 136 includes a flat surface on the underside of the laser housing mount 130 and the temperature control device 150 may be thermally coupled and mounted to the surface (e.g., using epoxy). The laser housing mount 130 allows the temperature control device 150 to be oriented and positioned in a manner that is compatible with, for example, a standard butterfly package housing. The laser housing mount 130 may further include a temperature sensor mounting portion 138 that receives and mounts the temperature sensor 160. According to one embodiment, the temperature sensor mounting portion 138 includes a recess or cavity in the laser housing mount 130 that receives at least a portion of the temperature sensor 160 and the temperature sensor 160 is thermally coupled and mounted to the laser housing mount 130 (e.g., using epoxy).

One embodiment of the temperature control device 150 includes a thermo-electric cooler (TEC) such as the type known to those skilled in the art for use in laser packages. The temperature control device 150 includes leads 152 that may be electrically coupled (e.g., by soldering) to the circuit board 123 to allow temperature control signals to be sent to and/or from control circuitry via the circuit board 123. According to one embodiment, the laser housing mount 130 conducts thermal energy to or from the laser-fiber housing 112 to or from the temperature control device 150. The temperature control device 150 thus controls the temperature of the laser housing 112 and the components (e.g., the laser 113) located within the laser-fiber housing 112. One embodiment of the temperature sensor 160 includes a thermistor such as the type known to those skilled in the art for used in laser packages. The temperature sensor 160 includes leads 162 that may be electrically coupled (e.g., by soldering) to the circuit board 123 to allow temperature sensor signals to be sent to and/or from control circuitry via the circuit board 123. Those skilled in the art will recognize that other types of temperature control devices and temperature sensors may be used in the modular laser package system 100.

Figure 3:
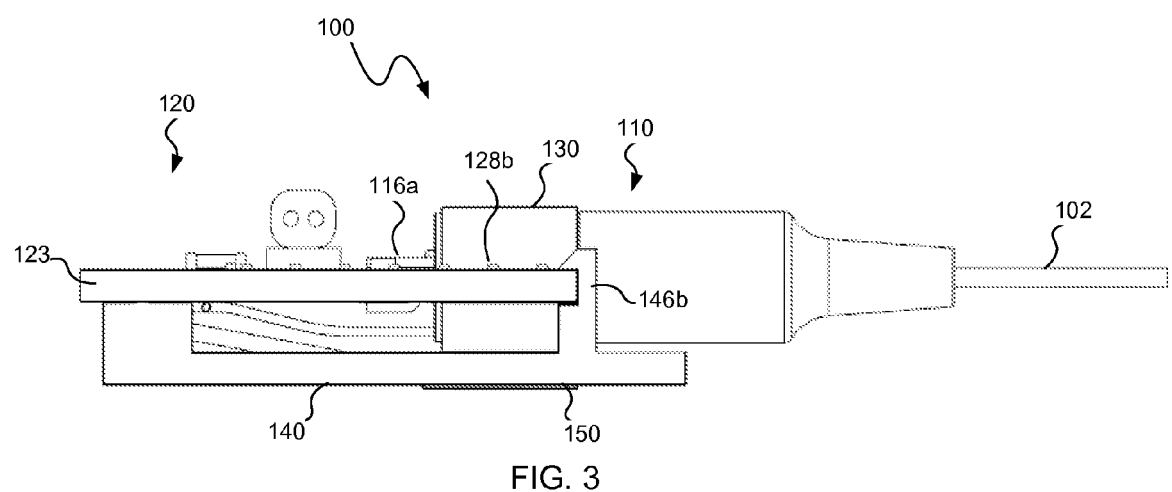
FIG. 3 is a side view of the modular laser package system of FIG. 1 assembled with the mounting base.

One embodiment of the mounting base 140 may include posts 142a, 142b that extend into corresponding holes 125a, 125b in the circuit board 123 and fingers 144a, 144b that engage an edge of the circuit board 123 at the opposite end (see FIG. 3). The mounting base 140 may be made out of a plastic material such as Delrin®. The posts 142a, 142b and holes 146a, 146b at the other end of the mounting base 140 may receive fasteners to facilitate mounting the assembled laser module to a circuit board designed for a typical butterfly type laser package.

Figure 2:
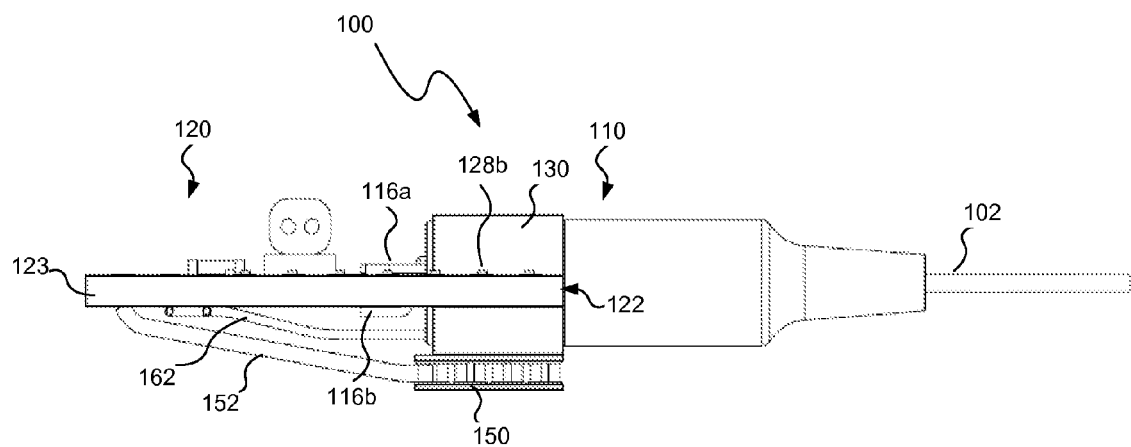
FIG. 2 is a side view of the modular laser package system of FIG. 1 assembled without the mounting base.

FIGS. 2 and 3 show the assembly of the modular laser package system 100. The laser package 110 may be positioned within the laser housing mount 130 and the laser housing mount 130 may be positioned in the mounting region 122 of the circuit board mounting platform 120. The laser housing mount 130 may be positioned and aligned, for example, such that leads 116a, 116b extend on the top and bottom of the circuit board 123 adjacent the respective contacts. The laser housing mount 130 may be electrically coupled to the circuit board 123 and the leads 116a, 116b may be electrically coupled to the contacts, for example, by soldering. The temperature control device 150 and the temperature sensor 160 may be mounted to the laser housing mount 130, for example, using epoxy. The temperature control leads 152 and the temperature sensor leads 162 may be electrically coupled to contacts on the circuit board 123, for example, by soldering. The mounting base 140 may then be secured or clipped onto the circuit board 123 to complete the assembly (FIG. 3).

The pins 128a, 128b may also be electrically coupled (e.g., by soldering) to the contacts 126a, 126b on each side of the circuit board 123 such that the pins 128a, 128b extend laterally. Other components and/or circuitry (e.g., interfacing circuitry) may also be electrically coupled to the circuit board 123.

Figure 4:
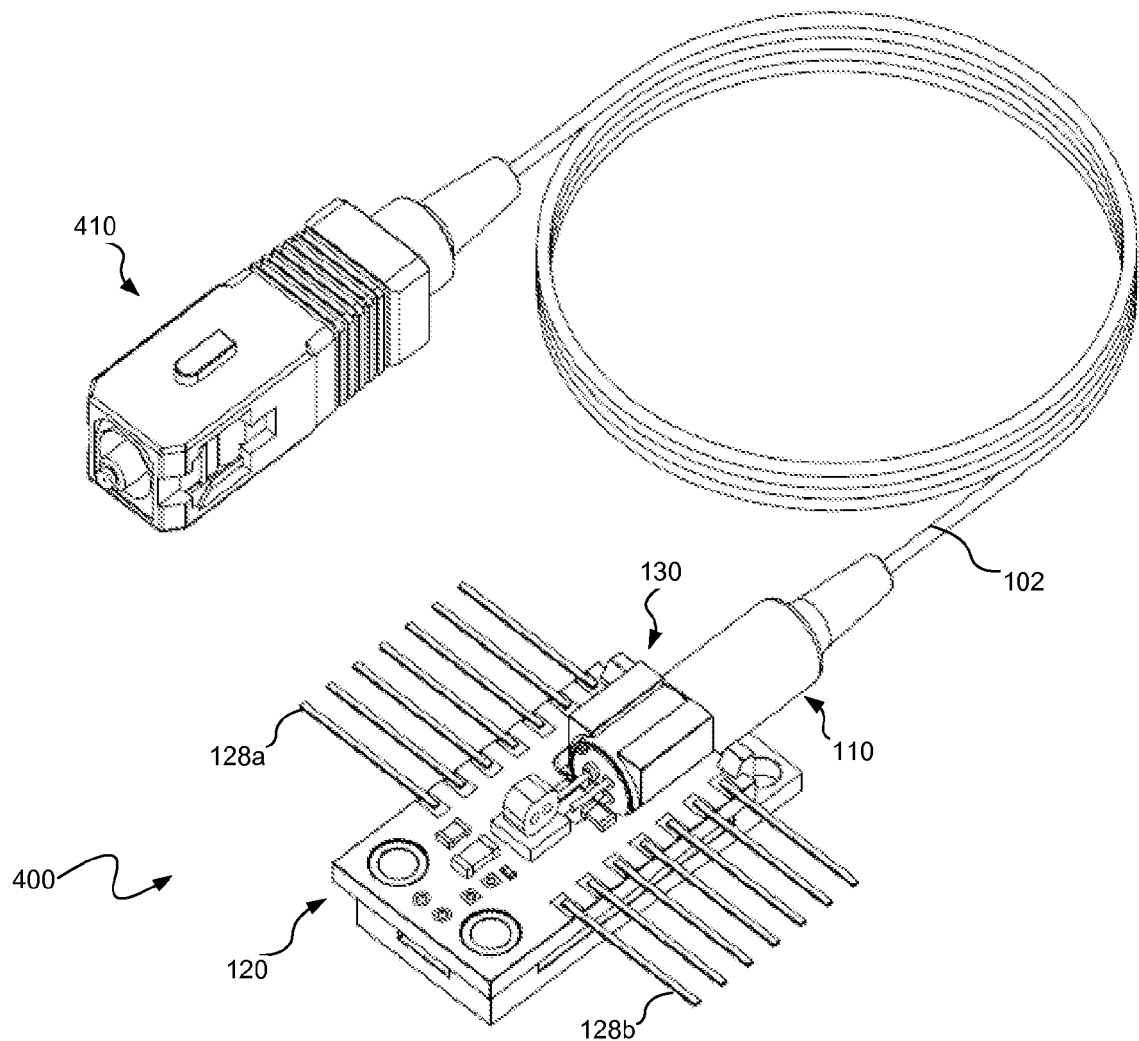
FIG. 4 is an isometric view of an assembled optical module including the modular laser package system of FIG. 1.

FIG. 4 shows an assembled optical module 400 consistent with one embodiment of the present invention. In the assembled optical module 400, the laser package 110 is coupled to the optical fiber 102 and mounted to the circuit board mounting platform 120 with the housing mount 130. An optical connector 410 may be coupled to the other end of the optical fiber 102. The assembled optical module 400 may be mounted to a circuit board, such as a transmitter board or motherboard, designed for a butterfly-type laser package. Thus, the assembled optical module 400 may be dimensioned and shaped similar to a standard butterfly package housing. One example of a standard butterfly laser package housing has a length of about 21 mm, a width of about 13 mm, a height of about 10 mm and 7 pins extending from each of the sides with each pin 13 mm long, 0.5 mm wide, and spaced about 2.5 mm apart. When the assembled optical module 410 is mounted in such a circuit board designed for a butterfly-type housing, the pins 128a, 128b may be flush with the upper surface of the board and in contact with the corresponding contacts on the board. The temperature control device 150 may engage a heat sink located within a mating section of the board.

Accordingly, the modular laser package system, consistent with embodiments of the present invention, may enable a temperature-stabilized laser having a lower cost than a conventional butterfly laser package but compatible with standard butterfly-compatible receiving devices, such as transmitter boards and associated heat sinks. The modular laser package system also enables an optical module that has higher performance than conventional TO can laser packages that do not provide temperature stabilization.

Consistent with one embodiment, a modular laser package system includes a laser package including a laser-fiber housing, a semiconductor laser optically coupled to an end of an optical fiber within the laser-fiber housing, and electrical leads electrically coupled to the laser and extending from a face of the laser-fiber housing. The modular laser package system also includes a circuit board mounting platform defining a mounting region and including contacts, wherein the contacts include at least a first group of the contacts configured to be electrically coupled to the electrical leads and at least a second group of the contacts configured to be electrically coupled to pins that extend laterally from opposing sides of the circuit board mounting platform. The modular laser package system further includes a laser housing mount configured to receive the laser-fiber housing and configured to be mounted within the mounting region of the circuit board mounting platform, and a temperature control device configured to be mounted to the laser housing mount for controlling the temperature of the laser package.

Consistent with another embodiment, a modular laser package system includes a circuit board mounting platform configured to receive and mount a laser-fiber housing. The circuit board mounting platform defines a mounting region and includes contacts on at least one surface thereof. The contacts include at least a first group of the contacts configured to be electrically coupled to electrical leads extending from a face of the laser-fiber housing and at least a second group of contacts configured to be electrically coupled to pins that extend laterally from opposing sides of the circuit board mounting platform. The modular laser package system also includes a thermally conductive laser housing mount configured to receive the laser-fiber housing and configured to be mounted within the mounting region of the circuit board. The thermally conductive laser housing mount including a housing mounting portion configured to receive and engage the laser-fiber housing in a slip fit and a temperature control device mounting portion configured to receive and mount a temperature control device.

Consistent with a further embodiment, a modular laser package system includes a laser package comprising a substantially cylindrical laser-fiber housing, a semiconductor laser optically coupled to an end of an optical fiber within the laser-fiber housing, and electrical leads electrically coupled to the laser and extending from a face of the laser-fiber housing. The modular laser package system also includes a circuit board mounting platform defining a mounting region and including contacts, wherein the contacts include at least a first group of the contacts electrically coupled to the electrical leads, and a plurality of pins electrically coupled to at least a second group of contacts and extending laterally from opposing sides of the circuit board mounting platform. The modular laser package system further includes a thermally conductive laser housing mount receiving the laser-fiber housing in a slip fit and mounted within the mounting region of the circuit board mounting platform and a temperature control device mounted to the laser housing mount to control the temperature of the laser package. The laser package, the circuit board mounting platform, the pins, the laser housing mount and the temperature control device are oriented and dimensioned to be compatible with a circuit board designed for a butterfly type laser package.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A modular laser package system comprising:
   a laser package comprising a substantially cylindrical laser-fiber housing, a semiconductor laser optically coupled to an end of an optical fiber within the laser-fiber housing, and electrical leads electrically coupled to the laser and extending from a face of the laser-fiber housing;
   a circuit board mounting platform defining a slot region and including contacts, wherein the contacts include at least a first group of the contacts electrically coupled to the electrical leads;
   a plurality of pins electrically coupled to at least a second group of contacts and extending laterally from opposing sides of the circuit board mounting platform;
   a thermally conductive laser housing mount receiving the laser-fiber housing in a slip fit and mounted within the slot region of the circuit board mounting platform;
   a temperature control device mounted to the laser housing mount to control the temperature of the laser package; and
   wherein the laser package, the circuit board mounting platform, the pins, the laser housing mount and the temperature control device are oriented and dimensioned to be compatible with a circuit board designed for a butterfly type laser package.

2. The modular laser package system of claim 1 wherein the laser package is selected from the group consisting of a coaxial laser package and a TO can laser package.

3. The modular laser package system of claim 1 further comprising a mounting base coupled to the circuit board mounting platform.

4. The modular laser package system of claim 1 wherein the circuit board is electrically coupled to the laser housing mount.

5. The modular laser package system of claim 1 wherein the laser housing mount, the laser-fiber housing and the circuit board mounting platform have the same ground plane.

* * * * *